(12) United States Patent
Lo Piccolo et al.

(10) Patent No.: US 11,866,238 B2
(45) Date of Patent: Jan. 9, 2024

(54) CAP FOR CONTAINERS, PLANT, METHOD AND FORMING DEVICE FOR MAKING SAID CAP

(71) Applicant: PELLICONI & C. S.p.A., Ozzano dell'Emilia (IT)

(72) Inventors: Antonino Lo Piccolo, Battipaglia (IT); Doriano Naldi, Ozzano dell'Emilia (IT)

(73) Assignee: PELLICONI & C. S.P.A., Ozzano Dell'Emilia (IT)

( * ) Notice: Subject to any disclaimer, the term of this patent is extended or adjusted under 35 U.S.C. 154(b) by 778 days.

(21) Appl. No.: 16/832,691

(22) Filed: Mar. 27, 2020

(65) Prior Publication Data

US 2020/0317410 A1 Oct. 8, 2020

(30) Foreign Application Priority Data

Apr. 3, 2019 (IT) .......................... 102019000005038

(51) Int. Cl.
*B65D 50/04* (2006.01)
*B65D 53/02* (2006.01)
(Continued)

(52) U.S. Cl.
CPC ........... *B65D 50/043* (2013.01); *B21D 51/44* (2013.01); *B29D 99/0096* (2013.01);
(Continued)

(58) Field of Classification Search
CPC ...... B65D 50/043; B65D 53/02; B21D 51/44; B29D 99/0096; B29K 2027/06; B29K 2705/00
(Continued)

(56) References Cited

U.S. PATENT DOCUMENTS 2,772,012 A 11/1956 Crabtree
3,473,683 A * 10/1969 Zipper .................... B29C 70/80
215/345

(Continued)

FOREIGN PATENT DOCUMENTS

CA 3077027 A1 * 10/2020 ................ B21D 1/44
DE 102019132561 A1 * 6/2021 ........... B65D 1/0442
(Continued)

OTHER PUBLICATIONS

Italian Search Report dated Dec. 12, 2019 for counterpart Italian Patent Application No. 102019000005038.

*Primary Examiner* — J. Gregory Pickett
*Assistant Examiner* — Niki M Eloshway
(74) *Attorney, Agent, or Firm* — Timothy J. Klima; SHUTTLEWORTH & INGERSOLL PLC

(57) ABSTRACT

A cap of the press-twist type for a container, includes: a metal capsule having a transversal wall of longest extension which extends transversely with respect to an axis of the container, and a lateral wall; a curling in the distal part with respect to the transversal wall of the lateral wall by means of a curling operation; a sealing gasket with an annular shape for engaging with an opening of the container. The sealing gasket is made of a PVC-free material and includes a lateral portion, positioned in contact with the lateral wall of the capsule, which includes two portions away from the transversal wall of the capsule: a first distal portion relative to the transversal wall of the capsule and a second proximal portion relative to the transversal wall of the capsule, with a thickness greater than the first distal portion.

16 Claims, 11 Drawing Sheets

(51) Int. Cl.
  *B21D 51/44*    (2006.01)
  *B29D 99/00*    (2010.01)
  *B29K 27/06*    (2006.01)
  *B29K 705/00*    (2006.01)

(52) U.S. Cl.
  CPC .......... *B65D 53/02* (2013.01); *B29K 2027/06* (2013.01); *B29K 2705/00* (2013.01)

(58) Field of Classification Search
  USPC ....................................................... 215/219
  See application file for complete search history.

(56) References Cited

U.S. PATENT DOCUMENTS

| | | | |
|---|---|---|---|
| 3,520,436 A * | 7/1970 | Vercillo | B65D 41/045 215/343 |
| 3,868,038 A * | 2/1975 | Hadley | B65D 41/0464 215/327 |
| 4,392,580 A | 7/1983 | Ochs | |
| 2002/0160137 A1 | 10/2002 | Varma | |
| 2017/0113847 A1 | 4/2017 | Fink et al. | |
| 2019/0039786 A1 | 2/2019 | Albonetti et al. | |

FOREIGN PATENT DOCUMENTS

| | | | | |
|---|---|---|---|---|
| GB | 2552491 A * | 1/2018 | ........... | B65D 1/0253 |
| GB | 2589711 A * | 6/2021 | ............... | B65D 1/10 |
| WO | WO-02064676 A2 * | 8/2002 | ......... | B65D 39/0011 |
| WO | 2010136307 A1 | 12/2010 | | |
| WO | 2017145083 A1 | 8/2017 | | |
| WO | WO-2017145083 A1 * | 8/2017 | ............. | B65D 41/16 |
| WO | WO-2020128415 A1 * | 6/2020 | ............... | B65D 1/10 |

\* cited by examiner

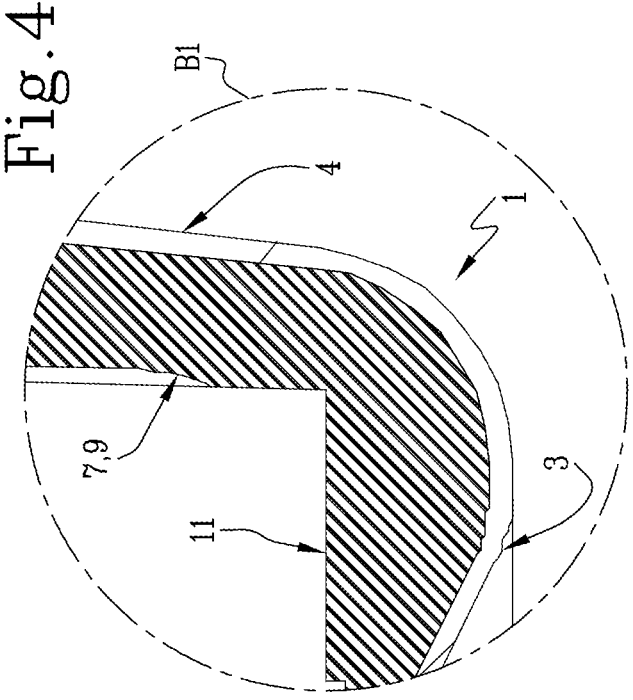
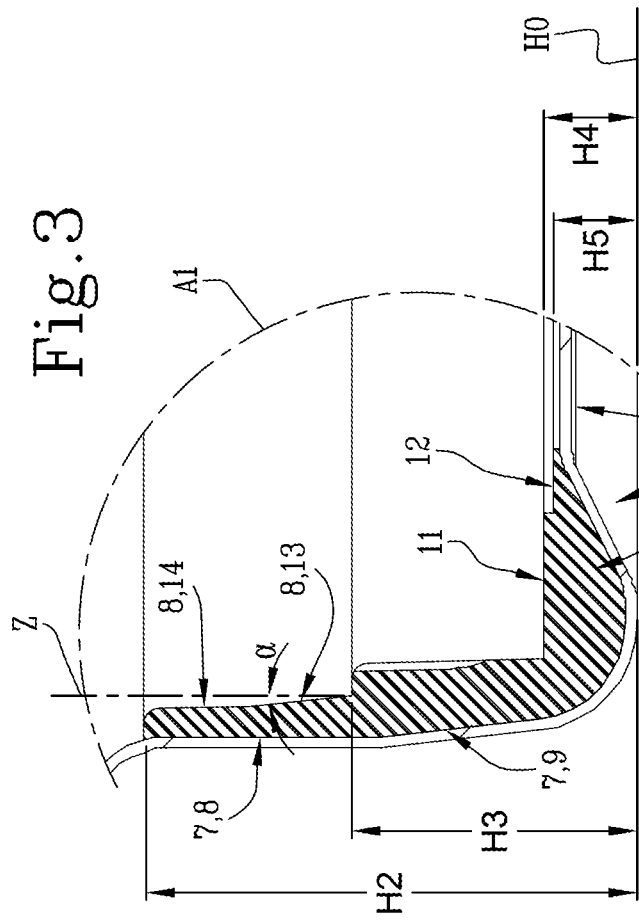
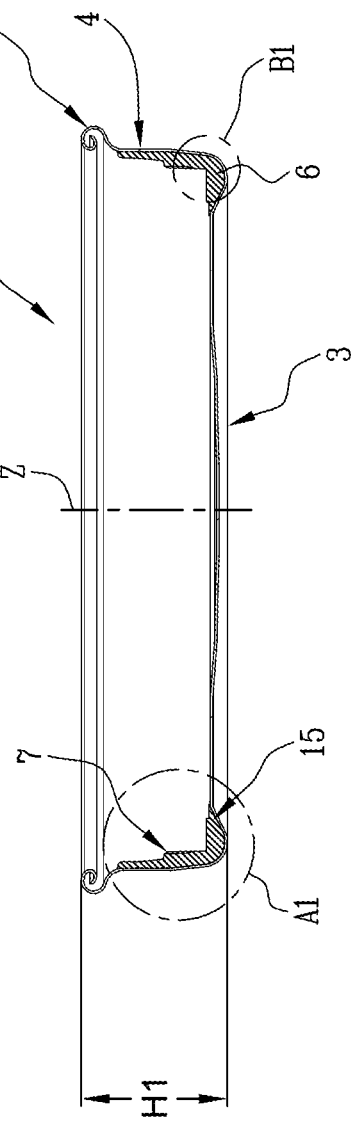

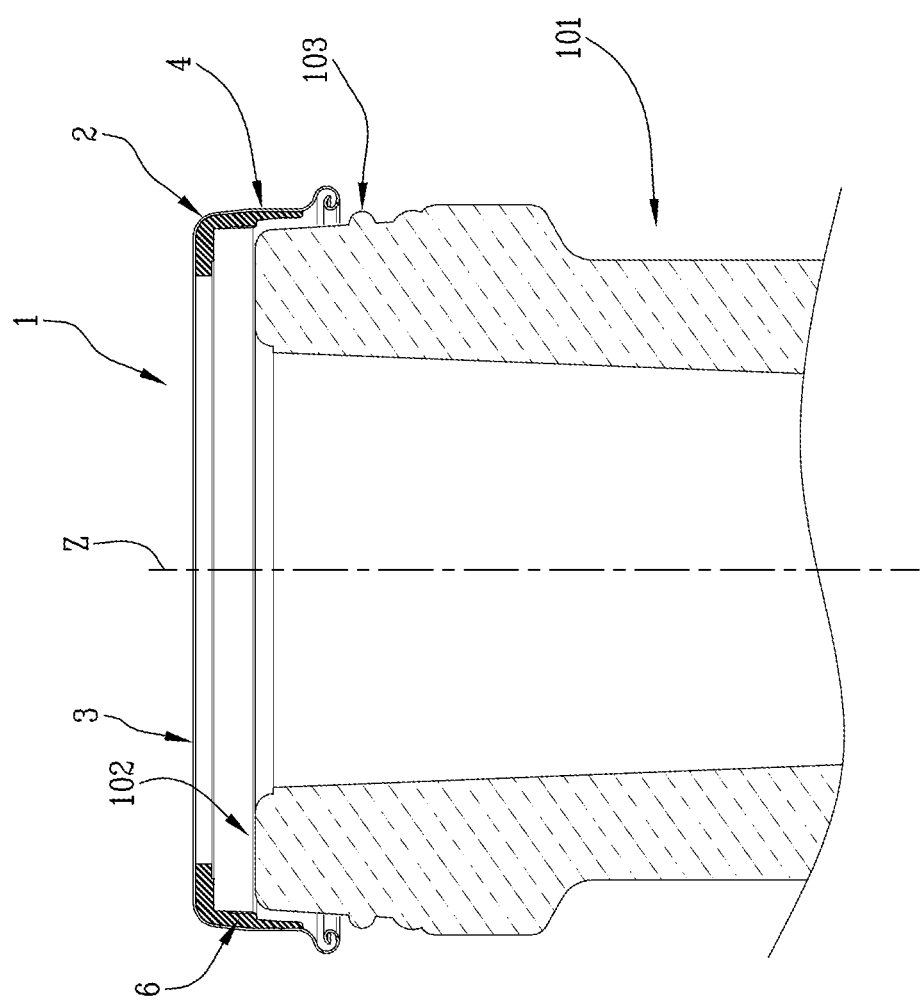

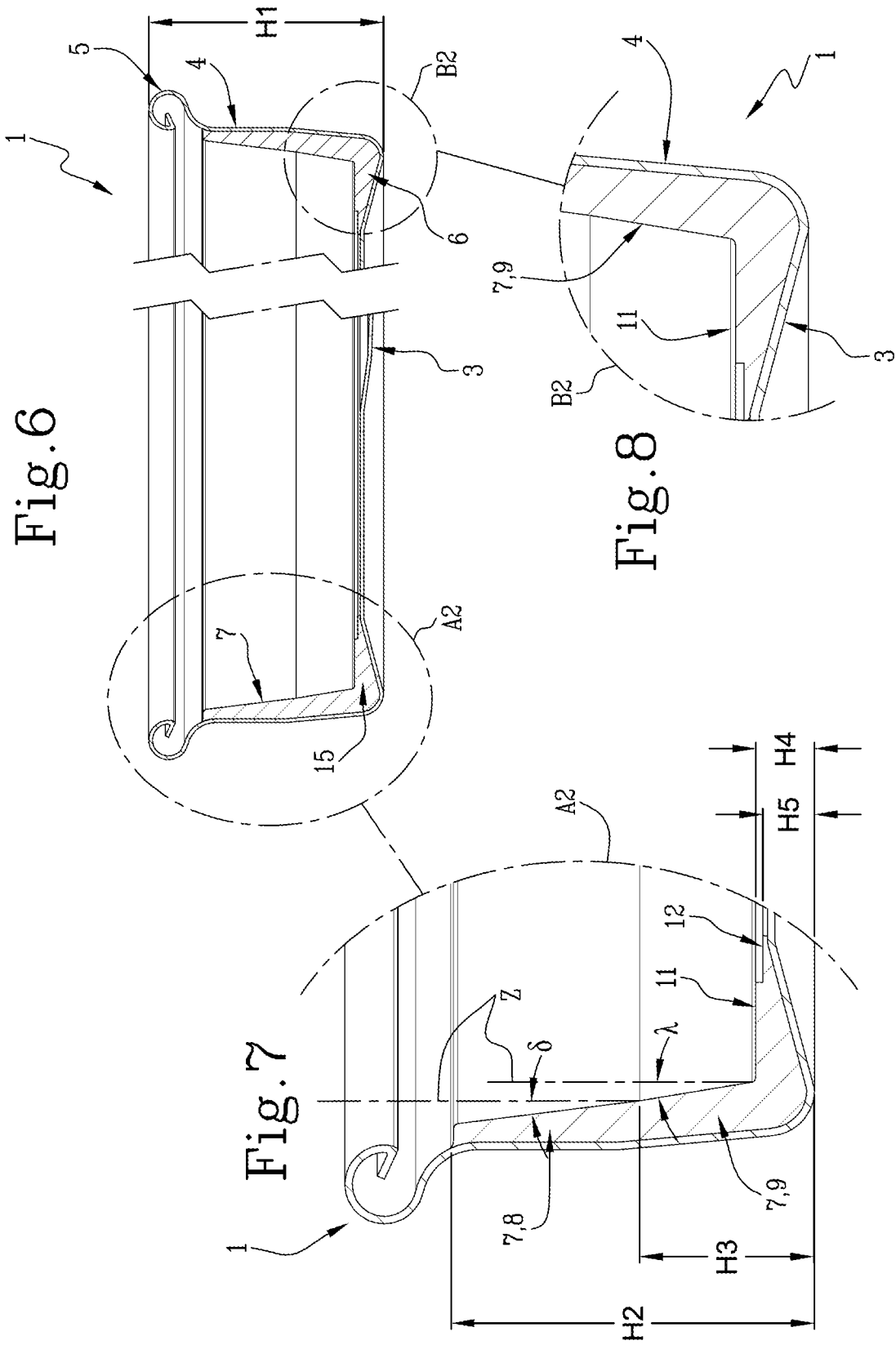

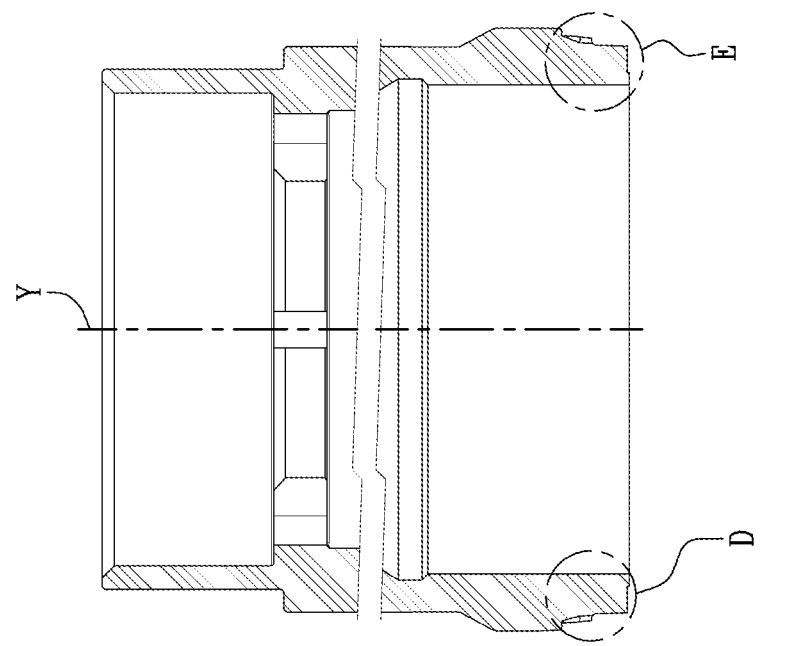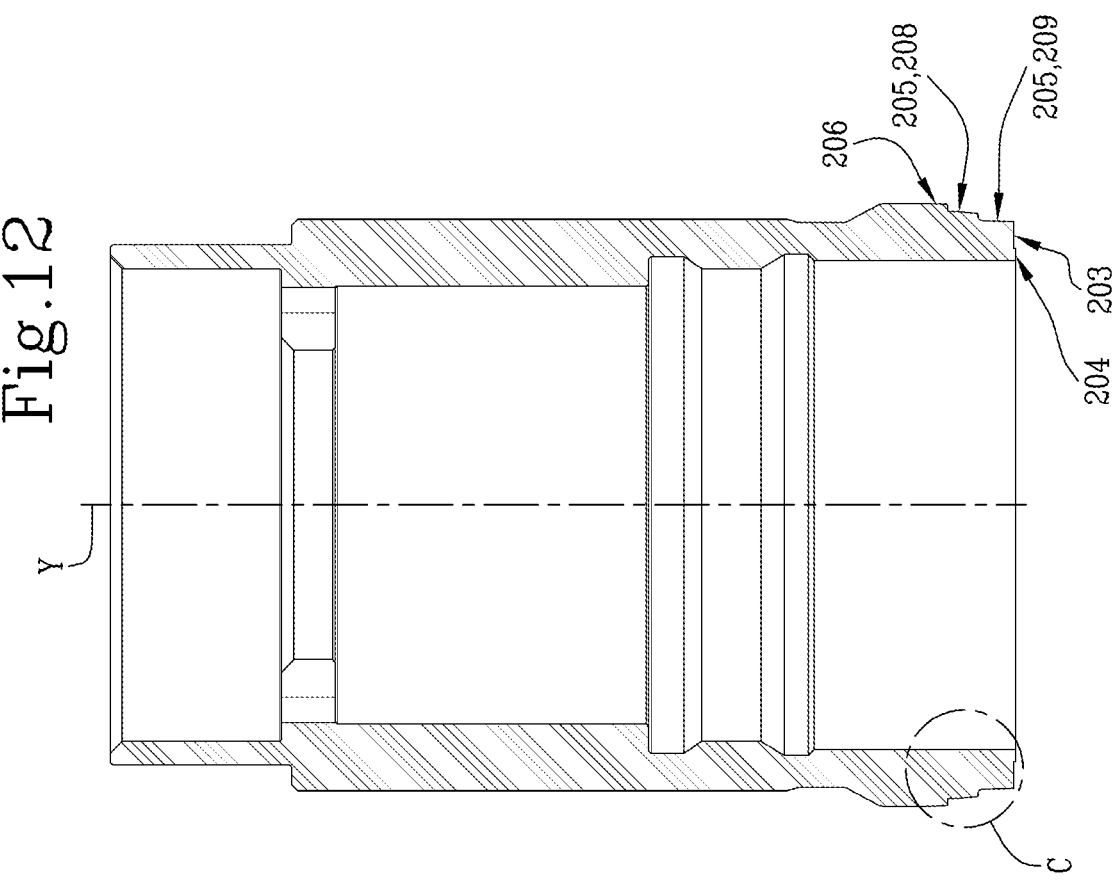

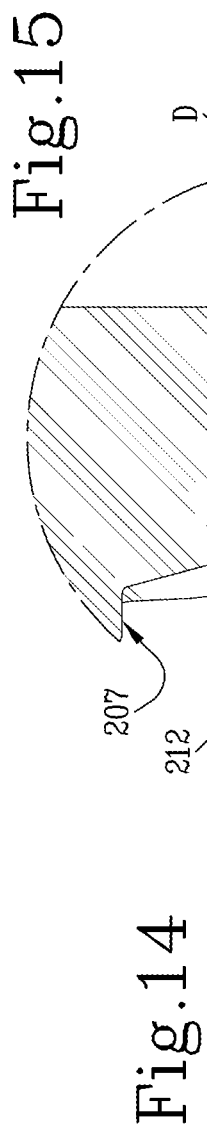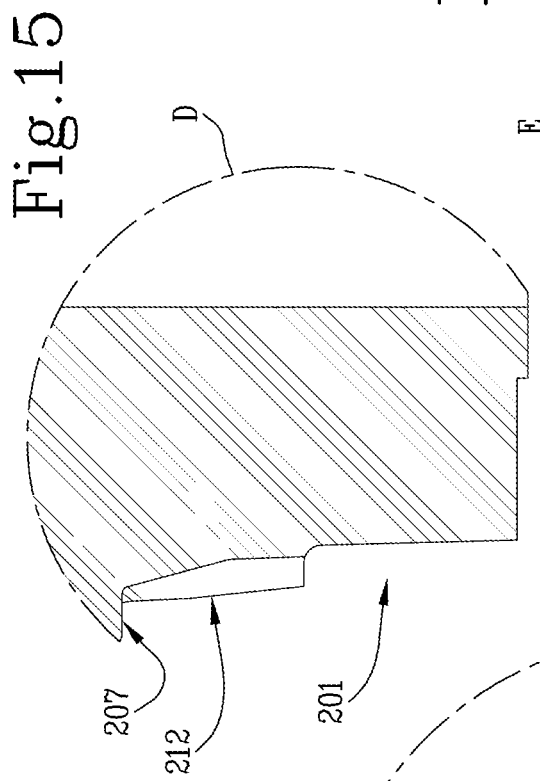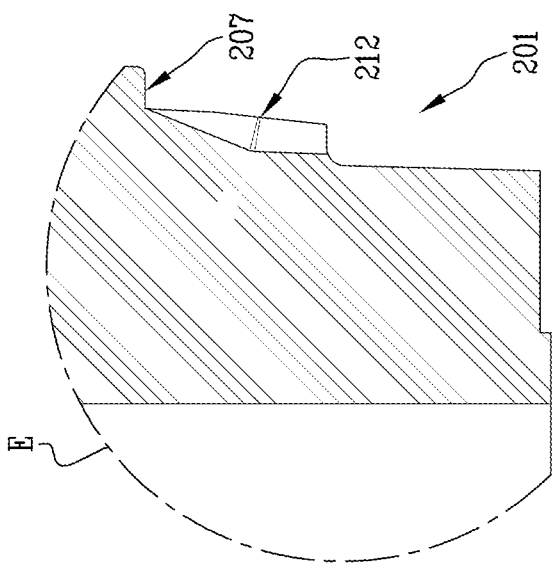

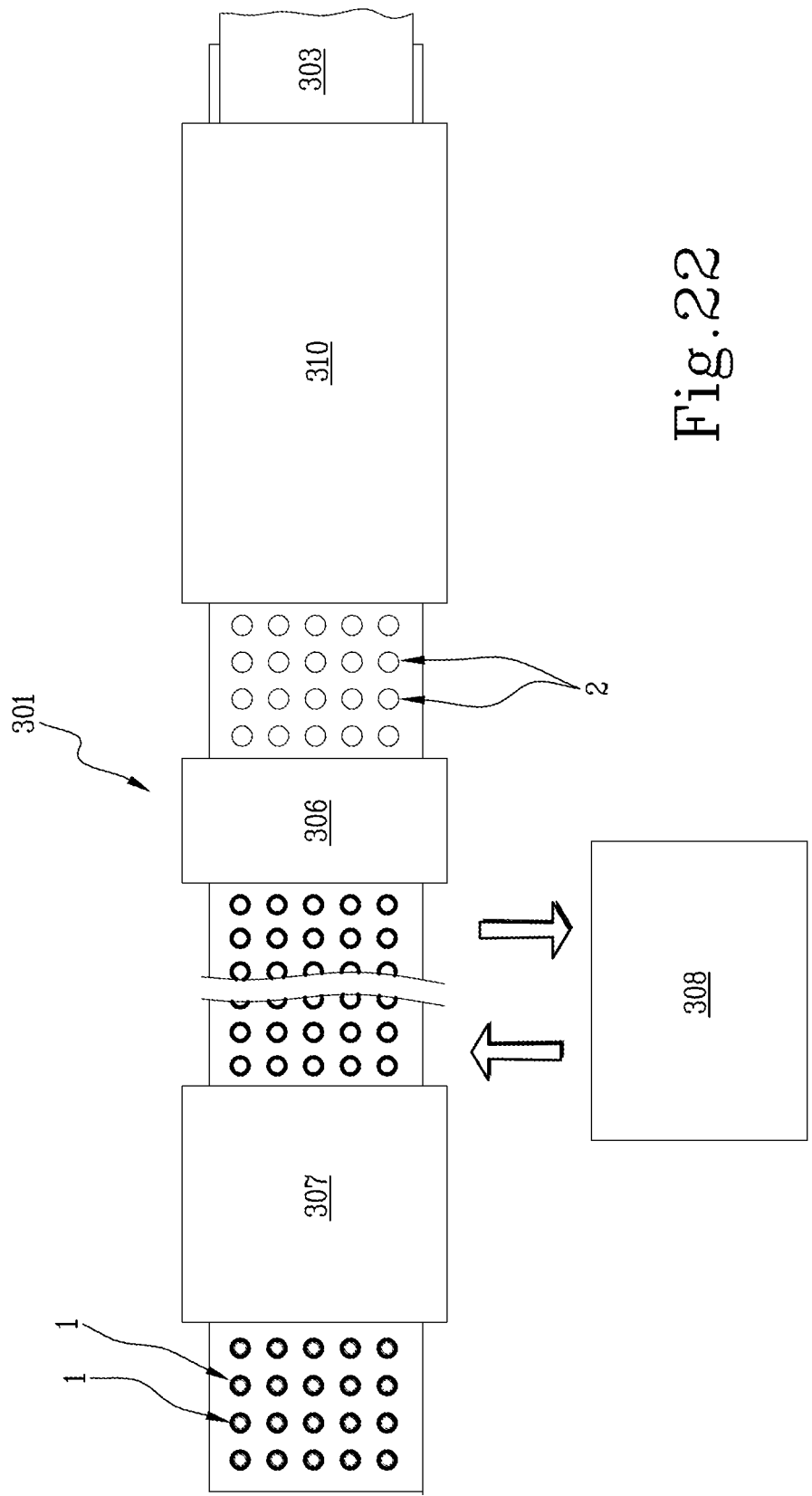

CAP FOR CONTAINERS, PLANT, METHOD AND FORMING DEVICE FOR MAKING SAID CAP

This application claims priority to Italian Patent Application 102019000005038 filed Apr. 3, 2019, the entirety of which is incorporated by reference herein.

BACKGROUND OF THE INVENTION

This invention relates to a cap for closing a container, in particular a cap of the type commonly known as press-twist, that is to say, wherein the cap is applied by pressing it on the relative opening of the container at the moment of the first closing. To remove the cap from the container an unscrewing operation is necessary.

The invention also relates to a device, a plant and a method for making the above-mentioned cap of the press-twist type.

SUMMARY OF THE INVENTION

The cap according to the invention may be used for closing containers designed to contain food products, for example subjected to chemical-physical treatments, such as, for example, pasteurization and sterilization.

The food products which can be packaged in the containers closed with the cap according to the invention comprise in particular, but not exclusively, food products known as "baby food", such as, for example, homogenized food products.

The cap according to the invention is particularly, not exclusively, suitable for closing glass containers, such as jars.

The caps of the press-twist type comprise a capsule, generally made of metal material, equipped with a lateral wall which extends about a longitudinal axis of the container (or axis of symmetry of the cap) and a transversal wall or base of larger extension which extends transversally relative to the above-mentioned longitudinal axis. The lateral wall is designed to engage with a neck of the container to which the cap will be applied, whilst the transversal wall is designed to obstruct an opening present at said neck of the container.

The caps of the press-twist type also comprise a sealing gasket with a circular shape positioned on the inner surface of the capsule, in the zone joining the transversal wall and the lateral wall, and which generally continues in contact with the inner surface of the lateral wall.

When the cap is applied to the container, said sealing gasket is deformed in such a way as to be able to adapt to the shape of the neck of said container. The neck has a thread, which, when the cap is pressed in the closing operations, is impressed in a specular fashion on the sealing portion in contact with the lateral walls.

The sealing gaskets are usually made of polyvinyl chloride-based materials, commonly abbreviated as PVC. Although having excellent performance in terms of sealing, these materials may contain toxic substances which, if released into the product inside the container, could represent a risk for the user.

To overcome this problem, use has been made of PVC-free sealing gaskets for press-twist caps, that is to say, sealing gaskets which do not have traces of PVC amongst their components.

However, the materials not containing PVC have physical, chemical and machine characteristics different from those of the materials containing PVC. More specifically, the materials for sealing gaskets which do not contain PVC are significantly stiffer than the materials containing PVC.

For this reason, the use of the same production techniques used for the caps with sealing gaskets having PVC might not guarantee adequate levels of performance in terms of seal and/or unscrewing torque of the closing element.

Patent document WO2017145083 A1 proposes a PVC-free sealing gasket with adequate specifications in terms of quality of the seal and of the unscrewing torque, providing a recess in the joining zone between the transversal wall and the lateral wall designed to contain part of the material making up the sealing gasket when this is compressed against the neck of the container, thus improving the seal of the closure.

The machines adopted so far for placing the sealing gasket act on the capsule before the curling operations, that is to say, those operations which comprise the folding of the distal part of the lateral wall to prevent injury to the user from the sharp edges of the lateral wall.

The presence of non-curved capsules has drawbacks during production as it prevents the intermediate storage of the semi-finished products because the sharp edges of the lateral walls might damage or scratch the other capsules if they are stacked on each other. Even if equipment is provided for allowing the storage of non-curved capsules which can reduce the risks of damage or scratching of the capsules, for example, flat storage, it should be noted that in any case significant surfaces would be occupied with considerable costs and installation difficulties.

The impossibility of storing caps by stacking them means that the machine for applying the sealing gasket operates continuously, close to and simultaneously with the machines for creating the metal capsule.

It is of fundamental importance that the machine for applying the PVC-free sealing gaskets can work continuously, to have a stability in the application of the PVC-free sealing gasket.

In that sense, a need particularly felt by the manufacturers of caps is that of having machines for making caps which can guarantee the intermediate storage of capsules with curling, in such a way as to be able to uncouple the operations performed on only the metal capsule from those for making the sealing gasket on it, with consequent advantages for the efficiency and reliability of the production process.

In fact, if a fault blocked, for example, the machine for applying the sealing gasket, it would be possible to continue with the operations for creating the metal capsule and curling and storing the semi-finished products until the fault is resolved.

Moreover, a further need for the manufacturers of caps is that of not having plastic waste in the sealing gasket zones furthest from the transversal wall of the capsule, both for aesthetic reasons and for the consumption of the material.

Generally speaking, this task is performed by a so-called "burr-cutter" device, which, however, acts on the sealing gasket of a cap before the curling is performed.

An aim of the invention is to provide a cap which satisfies the above-mentioned needs, in particular a PVC-free cap which guarantees a reliable seal and at the same time an easy opening by the user once applied to the container.

Another aim of the invention is to provide a cap for which the sealing gasket does not have residue of the plastic material which makes up the sealing gasket in the several zones of the sealing gasket furthest from the transversal wall of the capsule.

Another aim of the invention is to provide a plant and a method for making the cap which overcome the above-mentioned drawbacks and satisfy the above-mentioned needs, in particular which allow the intermediate storage of the metal capsule subjected to curling before application of the sealing gasket.

Another aim of the invention is to provide a forming device for placing the sealing gasket inside a metal capsule which is able to operate on a capsule subjected to curling so as to make an intermediate storage possible without the risk of damaging the capsules before the application of the sealing gasket.

Said aims are fully achieved according to the invention as characterized in the appended claims.

BRIEF DESCRIPTION OF THE DRAWINGS

These and other features are more apparent from the following description of a preferred embodiment, illustrated by way of non-limiting example in the accompanying drawings, in which:

FIG. 2 is a front cross-section view of the press-twist cap of FIG. 1 according to a first embodiment;

FIG. 3 is an enlarged front cross-section view of a detail A1 of FIG. 2;

FIG. 4 is an enlarged front cross-section view of a detail B1 of FIG. 2;

FIG. 5 is a front view of the press-twist type cap of FIG. 1 and a neck of a container to which the cap is applicable;

FIG. 6 is a front cross-section view of the press-twist cap of FIG. 1 according to a second embodiment;

FIG. 7 is an enlarged front cross-section view of a detail A2 of FIG. 6;

FIG. 8 is an enlarged front cross-section view of a detail B2 of FIG. 6;

FIG. 12 is a front view of the device for forming a sealing gasket of FIG. 9 according to a front cross-section along the cross-section plane I-I shown in FIG. 11;

FIG. 13 is a front view of the device for forming a sealing gasket of FIG. 9 according to a front cross-section along the cross-section plane II-II shown in FIG. 11;

FIG. 14 is an enlarged front view of a detail C of FIG. 12;
FIG. 15 is an enlarged front view of a detail D of FIG. 12;
FIG. 16 is an enlarged front view of a detail E of FIG. 12;

FIG. 22 is a top view of a preferred embodiment of a plant for making the press-twist cap according to the invention and for implementing the method according to the invention, which is also an object of the invention.

DESCRIPTION OF THE PREFERRED EMBODIMENTS

Figure 1:
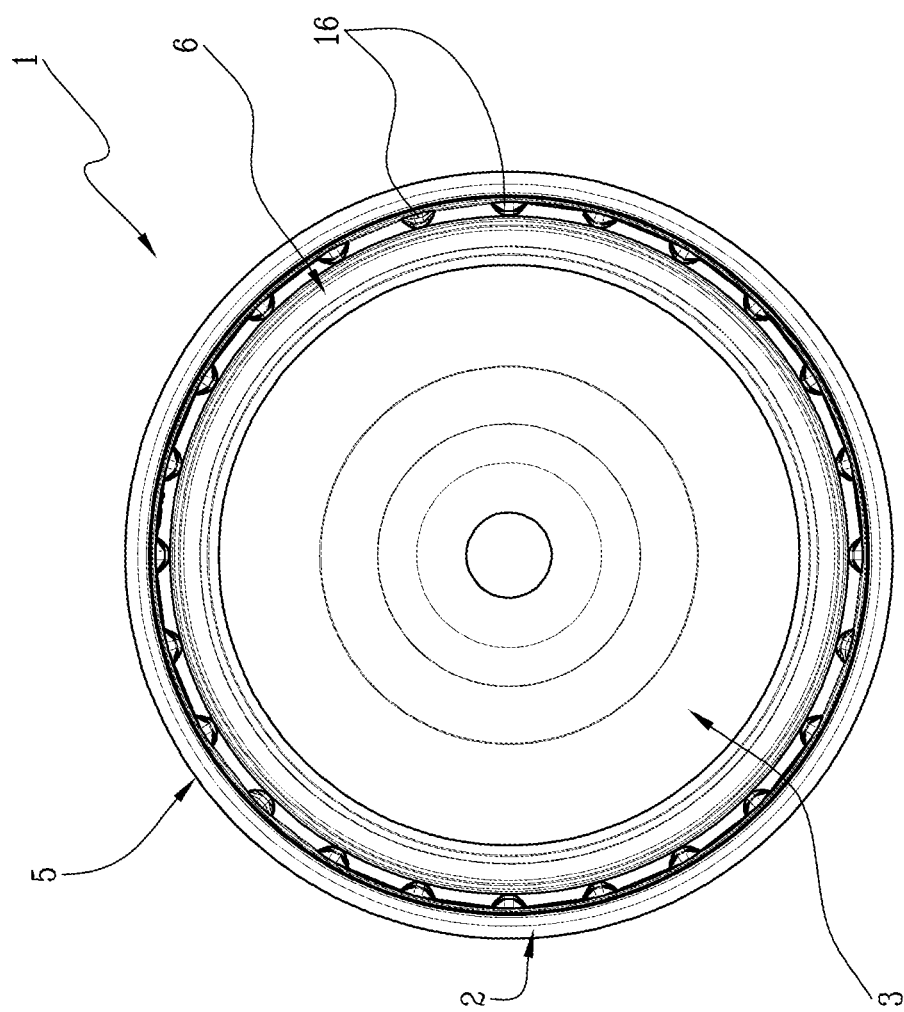
FIG. 1 is a top view of a press-twist cap according to the invention.
Figure 9:
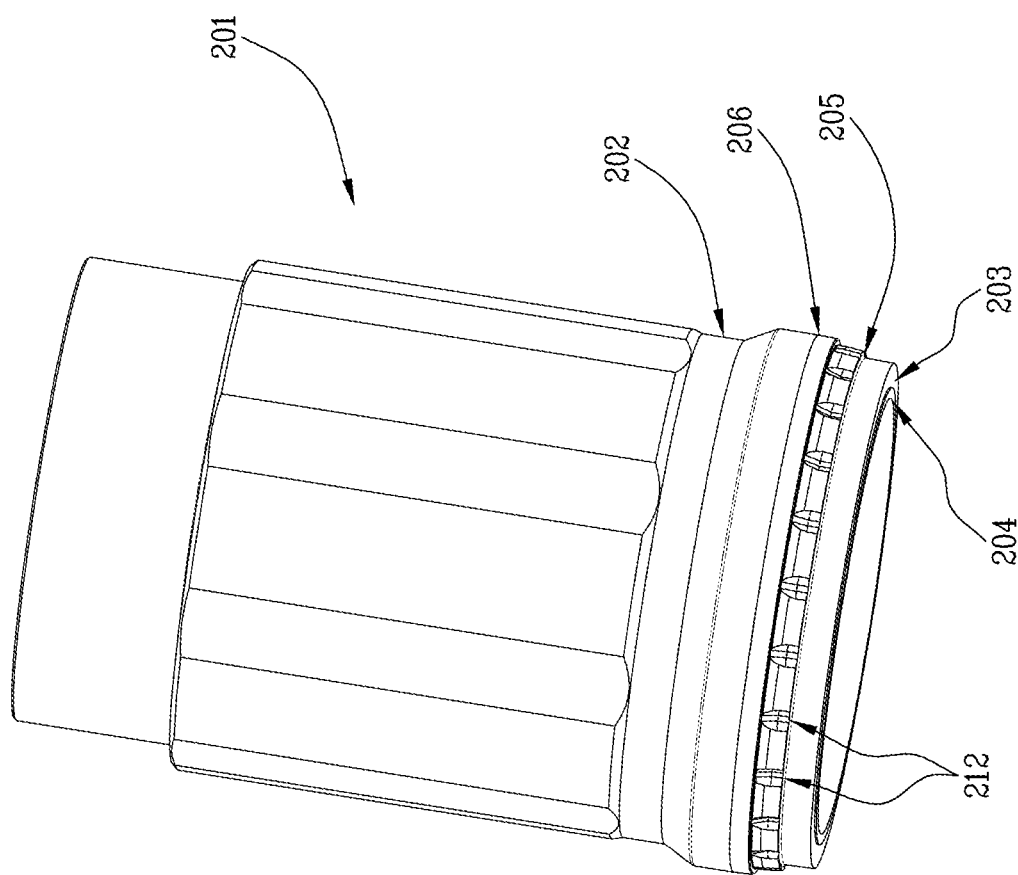
FIG. 9 is a perspective view of a device for forming a sealing gasket of the cap of the preceding drawings, according to a first embodiment associated with the cap of FIGS. 2 to 4.
Figure 11:
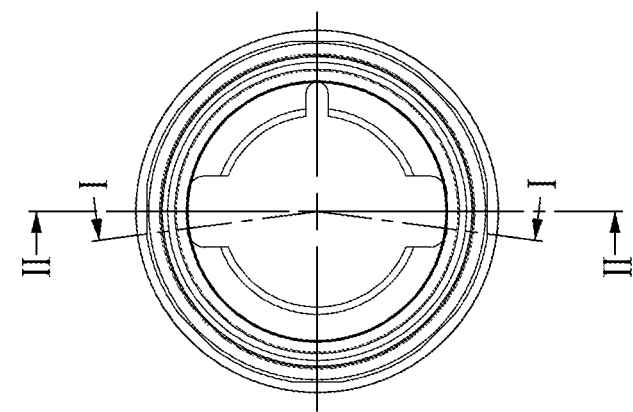
FIG. 11 is a top view of the device for forming a sealing gasket of FIG. 9.
Figure 10:
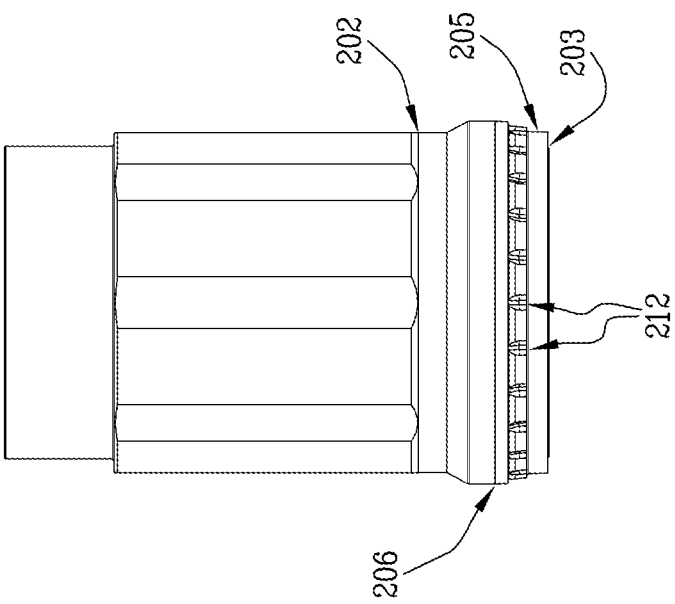
FIG. 10 is a front view of the device for forming a sealing gasket of FIG. 9.
Figure 18:
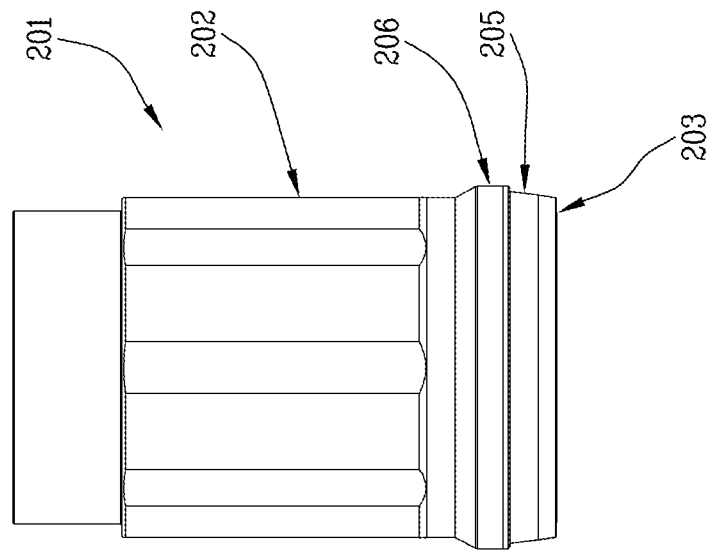
FIG. 18 is a front view of the device for forming a sealing gasket of FIG. 17.
Figure 17:
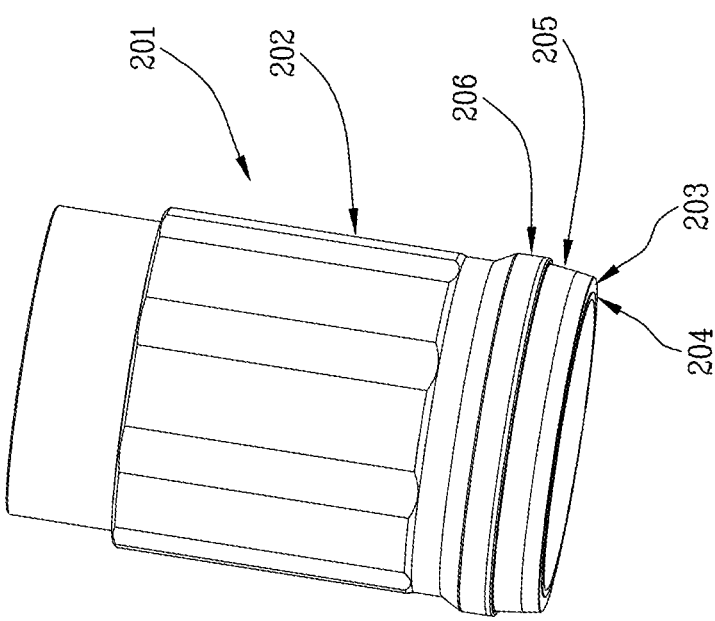
FIG. 17 is a perspective view of a device for forming a sealing gasket of the cap of the preceding drawings, according to a first embodiment associated with the cap of FIGS. 6 to 8.
Figure 20:
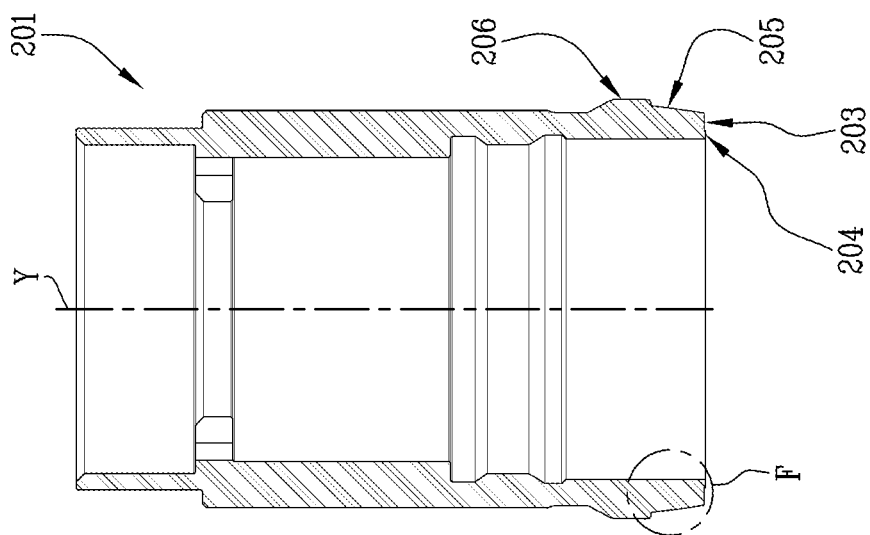
FIG. 20 is a front view of the device for forming a sealing gasket of FIG. 17 according to a front cross-section along the cross-section plane III-III shown in FIG. 19.
Figure 19:
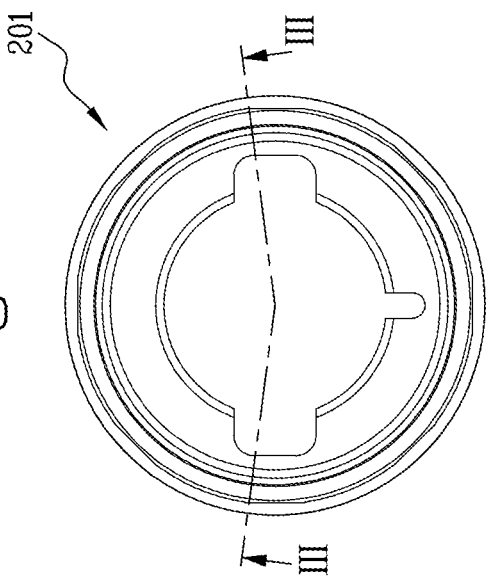
FIG. 19 is a top view of the device for forming a sealing gasket of FIG. 17.
Figure 21:
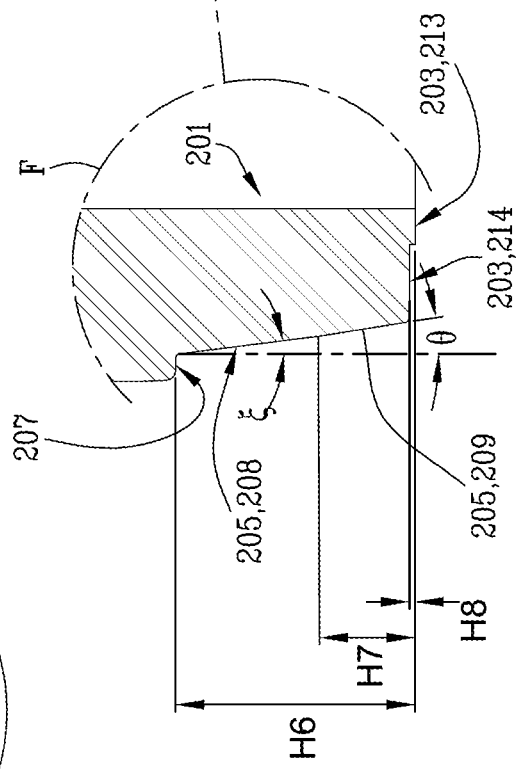
FIG. 21 is an enlarged front view of a detail F of FIG. 20.

With reference to FIGS. 1 to 8, the numeral 1 denotes a cap of the press-twist type for a container 101, that is to say, a cap designed to be applied by pressure to the container and to be removed from the container 101 by unscrewing.

According to an aspect of the invention, the cap 1 comprises a metal capsule 2 having a transversal wall 3 of longest extension which extends transversely with respect to an axis Z of the container, and a lateral wall 4 which extends longitudinally with respect to said axis Z.

Advantageously, the axis Z of the container 2 coincides with a circular axis of symmetry of the cap 1.

According to an embodiment, illustrated in FIG. 5, the transversal wall 3 of the capsule 2 may adopt a flat circular shape which lies in its entirety at a single reference height H0 relative to which the heights of other elements of the cap 1 are measured.

According to another embodiment, illustrated in FIG. 2, the transversal wall 3 of the capsule 2 may have recess zones 15 in its peripheral zone, the heights of the outermost end points of which (in this description "outer" means the zone of the cap opposite to that which comes into contact with the neck of the container during use whilst "inner" means the zone of the cap which comes into contact with the neck of the container during use) are taken as the reference height H0 relative to which the heights of other elements of the cap 1 are measured.

According to this embodiment, the central zone of the transversal wall 3 of the capsule 2 may adopt a flat circular shape or have a concavity towards the outside of the capsule 2.

According to another aspect of the invention, the lateral wall 4 of the capsule 2 extends circularly about the axis Z of the container up to a predetermined first height H1 relative to the reference height H0.

Advantageously, the lateral wall 4 of the capsule 2 has a curling 5 in its distal part with respect to the transversal wall 3 of the capsule 2 by means of a curling operation.

Preferably, the curling 5 faces towards the inside of the capsule 2 by means of the curling operation.

According to another aspect of the invention, the cap 1 has a sealing gasket 6 with an annular shape for engaging, during use, with an opening 102 of the container 101.

Advantageously, the sealing gasket 6 is made of a material, preferably plastic, free of PVC.

Preferably, the sealing gasket 6 is made of at least one or a combination of the following materials:
PE-HD or High-Density Polyethylene;
PE-LD or Low-Density Polyethylene;
PP or Polypropylene.

The sealing gasket 6 comprises a transversal portion 10 in contact with the transversal wall 3 of the capsule 2, inside the capsule.

Advantageously, the transversal portion 10 comprises two portions: a peripheral portion 11 ending at a fourth height H4 relative to the reference height H0 and a central portion 12 ending at a fifth height H5 relative to the reference height H0, strictly less than the fourth height H4.

Said heights H0, H1, H2, H3, H4 and H5 are measured along a direction parallel to that of the axis Z of the container (that is, at right angles to the transversal wall 3).

Moreover, the sealing gasket 6 comprises a lateral portion 7, in contact with the inner face of the lateral wall 4 of the capsule 2, in turn comprising two portions away from the transversal wall 3 of the capsule 2: a first distal portion 8 relative to the transversal wall 3 of the capsule 2 and a second proximal portion 9 relative to the transversal wall 3 of the capsule 2.

According to another aspect of the invention, the first distal portion 8 terminates at a second height H2 relative to the reference height H0.

The second proximal portion 9 terminates at a third height H3 relative to the reference height H0. Said third height H3 is less than the second height H2.

Advantageously, the ratio between the above-mentioned second height H2 and first height H1, that is, H2/H1, is greater than or equal to 0.55.

Still more advantageously, the ratio between the above-mentioned second height H2 and first height H1, that is, H2/H1, is greater than or equal to 0.70.

On the other hand, advantageously, the ratio between the above-mentioned second height H2 and first height H1, that is, H2/H1, is less than or equal to 0.90 (preferably 0.85).

Still more advantageously, the ratio between the above-mentioned second height H2 and first height H1, that is, H2/H1, is less than or equal to 0.80.

According to a first embodiment of the cap 1, illustrated in FIGS. 2 to 4, the first distal portion 8 has a thickness less than that of the second proximal portion 9.

According to another aspect of the first embodiment of the cap 1, the second proximal portion 9 relative to the transversal wall 3 of the capsule 2 of the lateral portion 7 of the sealing gasket has an inclination relative to the axis Z of the container of between 0.5° and 2.5°.

According to another aspect of this embodiment of the cap 1, the first distal portion 8 with respect to the transversal wall 3 comprises two parts: a lower part 13 and an upper part 14.

The inclination α relative to the axis Z of the container of the lower part 13 is preferably between 4.5° and 7.5°.

The inclination relative to the axis Z of the container of the upper part 14 is preferably between 1° and 3.5°.

According to a second embodiment of the cap 1, illustrated in FIGS. 6 to 8, the first distal portion 8 has an inclination relative to the axis Z different from the second proximal portion 9.

According to an aspect of this embodiment, the first distal portion 8 has an inclination δ relative to the axis Z preferably between 5° and 9° (more preferably between 6° and 8°).

According to another aspect of this embodiment, the second proximal portion 9 has an inclination λ relative to the axis Z preferably between 7° and 11° (more preferably between 8° and 10).

Preferably, said inclinations δ and λ are different from each other.

Advantageously, in both the embodiments of the cap 1, the first distal portion 8 relative to the transversal wall 3 has a plurality of peaks 16, illustrated in FIG. 1, and designed to engage about a projection 103 present close to the opening 102 of the container 101 to improve the closing seal of the cap.

Preferably, said peaks 16 may have two different shapes: a standard shape and a special shape.

Still more preferably, the number of peaks of standard shape is at least equal to the number of peaks of special shape.

The peaks with a special shape are equally spaced; by way of non-limiting example there may be three peaks with a special shape positioned at an angular distance of 120°. A predetermined number, not zero, of peaks of standard shape is interposed between two consecutive peaks of special shape.

Advantageously, the use of the cap 1 of the press-twist type for closing a container 101 makes it possible to implement a closure which is simultaneously reliable from the point of view of the seal and easy for the user to open when the cap 1 is applied to the container.

Moreover, the cap 1 advantageously has a sealing gasket without traces of PVC. The absence of PVC, which is a harmful component for the human body, makes it possible to reduce the risks resulting from the swallowing of product stored inside the container 101, in particular when the product is a baby food product.

The contact between the product stored in the container 101 and the sealing gasket 6 of the cap according to the invention does not, in this way, result in an exchange of PVC, thus eliminating the risks resulting from the insertion of this plastic material in the human body.

The fact of having fixed the ratio between the above-mentioned second height H2 and first height H1, that is, H2/H1, makes it possible to fix, advantageously, the height at which the sealing gasket 6 ends and prevent the presence of residue of plastic material which is not modelled in the part of the sealing gasket 6 furthest away from the transversal wall 3 of the capsule 2 (which would result in blemishes and could cause problems of reliability of the seal).

With reference to FIG. 22, the numeral 301 denotes a plant for making the cap 1 described above and illustrated in FIGS. 1 to 8.

The plant 301 comprises a plurality of stations which are described below in the order in which they operate for the passage from the raw material to the finished product (cap 1).

The plant 301 comprises a first station 310 for forming capsules in which a metal sheet 303 is cut and deformed to create a plurality of capsules 2 having the transversal wall 3 and the lateral wall 4. In the capsule forming station 310, the waste material of the metal sheet 303 is also removed, that is to say, the portions of said metal sheet 303 which are not used to make the capsules 2.

The metal sheet 303 may already have printing. According to this embodiment, the plant 301 comprises a station for printing on the metal sheet 303 upstream of the capsule forming station 310.

Subsequently, the plant 301 has a curling station 306 in which is formed, by means of a curling operation (that is, plastic deformation), the curling 5 in the part of the lateral wall 4 of the capsule 2 distal from the transversal wall 3 of the capsule 2.

Next, in the plant 301 there is a station 307 for forming a sealing gasket, in which a predetermined quantity of PVC-free material is released into the capsule 2 through means for releasing a predetermined quantity of PVC-free material inside the capsule 2.

In the forming station 307, a device 201 for forming a sealing gasket deforms said predetermined quantity of PVC-free material released inside the capsule 2 so as to make the sealing gasket 6.

Advantageously, said release means comprise a plurality of nozzles (not illustrated) designed to deposit the predetermined quantity of PVC-free material inside the capsule 2 at predetermined points.

Said device 201 for forming a sealing gasket is shown in different views in FIGS. 9 to 21 in two preferred, but non-limiting embodiments.

According to one aspect, the device 201 for forming a sealing gasket comprises a plunger 202 having a transversal wall 203 equipped with a lower end 204.

Said transversal wall 203 of the device 201 for forming a sealing gasket comprises two portions: a central portion 213 and a peripheral portion 214.

Preferably, the central portion 213 of the transversal wall 203 coincides (that is, it abuts at the same height relative to the direction of extension of the axis of extension of the forming device 201) with the lower end 204 of the forming device 201.

The peripheral portion 214 of the transversal wall 203 abuts at an eighth height H8 greater than that of the central portion 213.

The eighth height H8 is equal to the difference between the fourth height H4 and the fifth height H5, that is, H8=H4−H5.

According to another aspect, the plunger 202 comprises a lateral wall 205.

The lateral wall 205 in turn comprises a forming ring 206 (that is, a ring 206 for containing a portion of the PVC-free material forming the sealing gasket), defined by a wall 207 extending in a direction transversal to the longitudinal axis Y of extension of the plunger 202.

The wall 207 of the forming ring 206 abuts at a sixth height H6 relative to the lower end 204 of the transversal wall 203 of the plunger 202. In particular, the sixth height H6 is equal to the difference between the second height H2 and the fifth height H5, that is, H6=H2−H5.

Advantageously, the forming ring 206 prevents, during the forming operation, the sealing gasket 6 from extending above the sixth height H6 (that is, it defines an end limit for forming the sealing gasket 6). In that way, the forming ring 206 performs a function similar to that of a "burr-cutter" device, which removes the portions of the sealing gasket 6, generally called burr, which abuts above a predetermined maximum height.

According to another aspect of the invention, the lateral wall 205 of the plunger 202 comprises two portions: a first distal portion 208 relative to the transversal wall 203 and a second proximal portion 209 relative to the transversal wall 203.

The second proximal portion 209 relative to the transversal wall 203 terminates at a seventh height H7 relative to the lower end 204 of the transversal wall 203 of the plunger 202. in particular, the seventh height H7 is equal to the difference between the third height H3 and the fifth height H5, that is, H7=H3−H5.

Said heights H6, H7 and H8 are measured along a direction parallel to that of the longitudinal axis Y of extension of the plunger 202.

According to a first embodiment of the forming device 201, shown in FIGS. 9 to 16, the second proximal portion 209 relative to the transversal wall 203 of the lateral wall 205 of the plunger 202 has an inclination relative to the axis Y of extension of the plunger of between 0.5° and 2.5°.

According to one aspect of the first embodiment of the forming device 201, the first distal portion 208 relative to the transversal wall 203 of the lateral wall 205 of the plunger 202 comprises, preferably, two parts: a lower part 210 and an upper part 211.

According to another aspect of the first embodiment of the forming device 201, the lower part 210 of the first distal portion 208 relative the transversal wall 203 of the plunger 202 has, preferably, an inclination β relative to the axis Y of extension of the plunger of between 4.5° and 7.5°.

The upper part 211 of the first distal portion 208 relative to the transversal wall 203 of the plunger 202 preferably has an inclination relative to the axis Y of extension of the plunger of between 1.5° and 3.5°.

According to a second embodiment of the forming device 201, illustrated in FIGS. 17 to 21, the first distal portion 208 relative to the transversal wall 203 of the plunger 202 has, preferably, an inclination relative to the axis Y of extension of the plunger of between 5° and 9° (more preferably between 6° and 8°).

According to another aspect of the second embodiment of the forming device 201, the second proximal portion 209 relative to the transversal wall 203 of the plunger 202 has, preferably, an inclination θ relative to the axis Y of extension of the plunger of between 7° and 11° (more preferably between 8° and 10°).

Advantageously, in both the embodiments of the forming device 201, said first distal portion 208 relative to the transversal wall 203 of the lateral wall 205 of the plunger 202 may comprise a plurality of recesses 212.

The recesses 212 may, advantageously, have two shapes: a special shape and a standard shape, illustrated respectively in FIG. 15 and in FIG. 16.

Preferably, the number of recesses 212 with a standard shape is at least equal to the number of recesses 212 with a special shape.

Still more preferably, the recesses 212 with a special shape are equispaced, by way of non-limiting example there may be three recesses with a special shape positioned at an angular distance of 120°. A predetermined number, not zero, of recesses of standard shape is interposed between two consecutive recesses of special shape.

Said recesses 212 of the first distal portion 208 relative to the transversal wall 203 of the lateral wall 205 of the plunger 202 are specular in shape relative to the peaks 16 of the first distal portion 8 relative to the transversal wall 3 of the lateral wall 4 of the capsule 2.

In other words, the PVC-free plastic material making up the sealing gasket 6 occupies these recesses 212 and creates on the lateral wall 7 of the sealing gasket 6 a plurality of peaks 16 in the two different shapes (see in this regard FIG. 1).

Once the sealing gasket 6 has been made in the station 307 for forming the sealing gasket, the cap may be considered completely made and ready for application to the container 101.

Preferably, the plant 301 comprises a station 308 for storing capsules with curling between the curling station 306 and the station 307 for forming a sealing gasket, where curled capsules 2 which do not have a sealing gasket 6 can be stacked and stored without the risk of damage.

According to this aspect, the sealing gasket 6 may be applied at a later stage.

The presence of the storage station 308 makes it possible to overcome the drawbacks linked to the previous plants for making caps of the press-twist type.

In particular, the plant 301 is able to continue the production even in the event of a fault on the last station 307 for forming a sealing gasket, since, through the storage station 308, it is possible to accumulate the semi-finished products (capsules with curling) without them being damaged and providing them at the entrance to the station 307 for forming a sealing gasket once this has restarted its normal operation.

In other words, due to the arrangement of the stations in the plant 301 and the presence of the storage station 308 it is possible to uncouple the processing performed by the curling station 306 from that performed by the station 307 for forming the sealing gasket.

In this way, the plant 301 need not, advantageously, be configured in such a way that there is continuity, proximity and simultaneousness between all the operations performed by the stations which the plant 301 comprises.

Also defined, according to the invention, is a method for making the cap 1 described above.

The method for making the cap 1 comprises the steps described below, in the order in which they are performed in the process for making the cap 1.

The method firstly comprises a step of forming a disc in which, starting from a metal sheet 303, a plurality of metal discs 304 is made by punching, which are then deformed to obtain a plurality of capsules 2 having a transversal wall 3 and a lateral wall 4.

This step preferably also comprises eliminating the waste material of the metal sheet 303, that is to say, the portions of the metal sheet 303 interposed between adjacent metal discs 304.

The method then comprises a curling step in which the curling 5 is made in the distal part of the lateral wall 4 relative to the transversal wall 3 of the capsule 2.

Subsequently, the method comprises a step of forming a sealing gasket, in which a predetermined quantity of PVC-free material is deposited inside the capsule 2, which is then deformed to create the sealing gasket 6 inside the capsule 2.

Preferably, the method may comprise, between the curling step and the step of forming a sealing gasket, a step of storing capsules with curling.

During the step of storing capsules with curling, the curled capsules (which do not have a sealing gasket 6) can be stacked and stored without the risk of damage so that the sealing gasket 6 is applied at a later time.

The presence of the step for storing capsules with curling makes it possible to overcome the drawbacks linked to the previous methods for producing caps of the press-twist type.

In particular, the presence of the step of storing capsules with curling makes it possible to uncouple in terms of time the curling steps and the step of forming a sealing gasket, which in the prior art methods are performed in reverse order compared with the method according to the invention and required continuity in terms of time.

The method according to the invention advantageously allows a cap to be made available in a particularly simple and inexpensive manner which is particularly reliable in terms of seal.

Thanks to the presence of the storage station, the method for making a cap 1 of the press-twist type also has an improvement in terms of productivity (as it can operate, even partly, in the case of faults to parts of the plant) and operating flexibility.

What is claimed is:

1. A cap for a container, the cap having a press-twist configuration and comprising:
    a metal capsule having a transversal wall of longest extension which extends transversely with respect to an axis of the container, and a lateral wall which extends up to a first height H1 with respect to the transversal wall about said axis of the container,
    a curling in a distal part of said lateral wall relative to the transversal wall,
    a sealing gasket with an annular shape for engaging with an opening of the container, the sealing gasket comprising a transversal portion, positioned in contact with the transversal wall of the capsule, and a lateral portion, positioned in contact with the lateral wall of the capsule and ending at a height H2 with respect to the transversal wall of the capsule;
    wherein the sealing gasket is made of a material which is free of PVC and wherein a ratio H2/H1 between the second height H2 and first height H1 is between 0.55 and 0.90;
    wherein the lateral portion comprises a first distal portion relative to the transversal wall of the capsule and the first distal portion relative to the transversal wall has a plurality of peaks configured to engage around a projection present close to the opening of the container to improve a closing seal with respect to the container;
    wherein the plurality of peaks are arch-shaped toward an interior of the cap.

2. The cap according to claim 1, wherein the ratio H2/H1 is between 0.70 and 0.80.

3. The cap according to claim 1, wherein the lateral portion further requires a second proximal portion relative to the transversal wall of the capsule; said first distal portion and second proximal portion having different inclinations relative to the axis of the container.

4. The cap according to claim 3, wherein the second proximal portion of the lateral portion has a thickness greater than the first distal portion of the lateral portion.

5. The cap according to claim 1, wherein the transversal portion comprises two portions: a peripheral portion ending at a fourth height H4 relative to the transversal wall of the capsule and a central portion ending at a fifth height H5 relative to the transversal wall of the capsule, the fifth height H5 being less than the fourth height H4.

6. A device for forming a sealing gasket of a cap according to claim 5, comprising a plunger having a transversal wall including a lower end and a lateral wall having a forming ring, defined by a wall which extends in a transversal direction with respect to a longitudinal axis of extension of said plunger, with said wall positioned at a sixth height H6 relative to a lower end of said transversal wall of the plunger, the sixth height H6 being equal to a difference between the second height H2 and the fifth height H5:H6=H2−H5.

7. The device according to claim 6, wherein the relative to the transversal wall terminates at said forming ring, the lateral wall further comprising a second proximal portion relative to the transversal wall ending at a seventh height H7 relative to a lower end of said transversal wall of the pad, the seventh height H7 being equal to a difference between a third height H3 at which the second proximal portion terminates and the fifth height H5:H7=H3−H5.

8. The device according to claim 7, wherein the second proximal portion relative to the transversal wall of the lateral wall has an inclination relative to the axis of extension different from an angle relative to the axis of extension which the first distal portion has relative to the transversal wall of the lateral wall.

9. The device according to claim 8, wherein the first distal portion relative to the transversal wall of the lateral portion comprises two parts: a lower part and an upper part.

10. The device to claim 6, wherein the first distal portion relative to the transversal wall of the lateral portion has a plurality of recesses having at least two different shapes.

11. The device according to claim 6, wherein the transversal wall comprises two portions: a central portion and a peripheral portion ending at an eighth height H8 greater than that of the central portion, the eighth height H8 being equal to a difference between the fourth height H4 and the fifth height H5:H8=H4−H5.

12. The cap according to claim 1, wherein the plurality of peaks have at least two different shapes.

13. A plant for making the cap according to claim 1, comprising:
   a station for forming the capsules from a metal sheet, configured to punch and deform said metal sheet to make the capsules;
   a curling station, in which the curling is made in the distal part of the lateral wall of the capsule relative to the transversal wall of the capsule;
   a station for forming a seal, comprising a device for forming a seal, the forming station also comprising a mechanism for releasing a predetermined quantity of material free of PVC inside the capsule and wherein the device for forming the seal deforms said predetermined quantity of material free of PVC released inside the capsule to make the sealing gasket.

14. The plant for making the cap according to claim 13, wherein between the curling station and the station for forming the seal, the plant includes a station for storing capsules with curlings.

15. A method for making a cap, comprising, in sequence, the steps of:
   providing a cap for a container, the cap having a press-twist configuration and comprising:
      a metal capsule having a transversal wall of longest extension which extends transversely with respect to an axis of the container, and a lateral wall which extends up to a first height H1 with respect to the transversal wall about said axis of the container,
      a curling in a distal part of said lateral wall relative to the transversal wall,
      a sealing gasket with an annular shape for engaging with an opening of the container, the sealing gasket comprising a transversal portion, positioned in contact with the transversal wall of the capsule, and a lateral portion, positioned in contact with the lateral wall of the capsule and ending at a height H2 with respect to the transversal wall of the capsule;
   wherein the sealing gasket is made of a material which is free of PVC and wherein a ratio H2/H1 between the second height H2 and first height H1 is between 0.55 and 0.90;
   wherein the lateral portion comprises a first distal portion relative to the transversal wall of the capsule and the first distal portion relative to the transversal wall has a plurality of peaks configured to engage around a projection present close to the opening of the container to improve a closing seal with respect to the container;
   wherein the plurality of peaks are arch-shaped toward an interior of the cap;
   forming a disk by punching a metal sheet and deforming said disk to make the capsule;
   curling the capsule, in which the curling is made in the distal part of the lateral wall relative to the transversal wall of the capsule;
   forming the sealing gasket, comprising the steps of depositing a predetermined quantity of material free of PVC inside the capsule and subsequently deforming the material free of PVC inside the capsule to create the sealing gasket.

16. The method according to claim 15, wherein between the step of curling and the step of forming the sealing gasket, there is a step for storing capsules with curlings.

* * * * *